United States Patent [19]
Yamada

[11] Patent Number: 6,025,584
[45] Date of Patent: Feb. 15, 2000

[54] IMAGE READING APPARATUS HAVING A LIGHT SOURCE CONTROLLER

[75] Inventor: Makoto Yamada, Gifu, Japan

[73] Assignee: Brother Kogyo Kabushiki Kaisha, Nagoya, Japan

[21] Appl. No.: 09/049,934

[22] Filed: Mar. 30, 1998

[30] Foreign Application Priority Data

Mar. 31, 1997 [JP] Japan .................................... 9-080392

[51] Int. Cl.$^7$ .................................................. G01J 1/32
[52] U.S. Cl. ........................................... 250/205; 358/475
[58] Field of Search ................................ 250/205, 208.1, 250/234; 355/115, 119, 120; 358/475; 362/13, 20

[56] References Cited

U.S. PATENT DOCUMENTS 5,122,665   6/1992   Kurashima ............................ 250/590

Primary Examiner—Que T. Le
Attorney, Agent, or Firm—Oliff & Berridge, PLC

[57] ABSTRACT

An image reading apparatus includes a transfer mechanism for successively transferring a plurality of document sheets along a transfer path, an instant-on type light source for irradiating each transferred document sheet with light, an image sensor for reading images of each transferred document sheet by detecting the light reflected therefrom, and a controller for turning on the light source while the image sensor is reading each transferred document sheet but for turning off the light source upon completion of reading each transferred document sheet.

14 Claims, 6 Drawing Sheets

IMAGE READING APPARATUS HAVING A LIGHT SOURCE CONTROLLER

BACKGROUND OF THE INVENTION

1. Field of the Invention

The present invention relates to an image reading apparatus of the type which uses an instant-on light source, particularly an instant-on fluorescent lamp, for irradiating each of successively transferred document sheets with light for reading the images of the document sheet.

2. Description of the Related Art

Typically, an image reading apparatus comprises a light source for irradiating a document sheet with light, and an image sensor for detecting the light reflected from the document sheet to generate image signals. An example of light source is an instant-on fluorescent lamp, whereas an example of image sensor is a CCD sensor.

For facilitating document feeding, an image reading apparatus is known which incorporates an automatic document feeder (ADF). In operation of an ADF type image reading apparatus, a plurality of document sheets are placed in a stack on a paper feed tray and successively transferred along a document transfer path. During transfer, an instant-on fluorescent lamp as a light source irradiates each transferred document sheet, and an image sensor detects the light reflected on the document sheet for generating electric image signals. In such successive document reading, normally, the fluorescent lamp is turned on at the time of feeding the first one of the plural document sheets and maintained in the ON state until the last document sheet is discharged.

On the other hand, the instant-on fluorescent lamp is known to exhibit luminous energy which progressively decreases with light-on time due to progressive temperature rise. Thus, if the lamp is kept on throughout the successive reading process, the reading quality deteriorates toward the end of the process particularly when performing color image reading. Further, since the lamp is continuously kept on, electric power is wastefully consumed in the reading interval between each two successive document sheets.

SUMMARY OF THE INVENTION

It is, therefore, an object of the present invention is to provide an image reading apparatus which is capable of reading each of successively transferred document sheets with a uniform quality.

Another object of the present invention is to provide an image reading apparatus which, while incorporating an instant-on fluorescent lamp as a light source, is capable of reading a single document sheet or each of successively transferred document sheets with a uniform quality even if the reading process is suspended halfway for the respective document sheet.

A further object of the present invention is to provide an image reading apparatus which is capable of successively reading a plurality of document sheets with reduced power consumption.

According to a first aspect of the present invention, there is provided an image reading apparatus comprising: a transfer mechanism for successively transferring a plurality of document sheets along a transfer path; a light source for irradiating each of the successively transferred document sheets with light; an image sensor for reading images of said each of the successively transferred document sheets by detecting the light reflected therefrom; and a controller for turning on the light source while the image sensor is reading said each of the successively transferred document sheets but for turning off the light source upon completion of reading said each of the successively transferred document sheets.

The technical advantages of the image reading apparatus will be specifically described hereinafter with reference to the accompanying drawings.

Preferably, the light source may be an instant-on fluorescent lamp having luminous energy which decreases with light-on time. However, any other light source having similar luminous energy characteristics may be used instead.

According to a preferred embodiment of the present invention, the image reading apparatus further comprises a white level control circuit, and the controller comprises a white level control data generator for generating white level control data on the basis of the light reflected from a first one of the successively transferred document sheets upon lapse of a preset wait time after the lamp is turned on. In operation, the white level control circuit adjusts the images of said each of the successively transferred document sheets on the basis of the white level control data generated by the controller.

The image reading apparatus may further comprise a memory for storing the images read by the image sensor. In this case, the controller may comprise a reading interrupter for turning off the light source in addition to suspending the reading of said each of the successively transferred document sheets when the memory becomes full, and an interruption canceler for turning on the light source in addition to restarting the reading of said each of the successively transferred document sheets when the memory becomes ready for image storage.

Alternatively, the controller may comprise a reading interrupter for turning off the light source in addition to suspending the reading of said each of the successively transferred document sheets when the image sensor reads a preset number of lines on said each of the successively transferred document sheets, and an interruption canceler for turning on the light source in addition to restarting the reading of said each of the successively transferred document sheets when a preset time lapses after the reading suspension.

Typically, the image sensor may be a full-color image sensor which includes a multiplicity of CCDs (charge-coupled devices) or photoelectric conversion elements. Instead, the image sensor may be a monochrome image sensor.

The controller may be a central processing unit of a machine which incorporates the image reading apparatus. For instance, the image reading apparatus may be incorporated in a facsimile machine or a photocopier as an image reading unit.

According to a second aspect of the present invention, there is provided an image reading apparatus comprising: a transfer mechanism for transferring a document sheet along a transfer path; a light source for irradiating the transferred document sheet with light; an image sensor for reading images of the transferred document sheet by detecting the light reflected therefrom; and a controller for turning on the light source while the image sensor is reading the transferred document sheet but for turning off the light source upon completion of reading the transferred document sheet; wherein the controller comprises a reading interrupter for turning off the light source in addition to suspending the reading of the transferred document sheet when the controller detects a predetermined cause for the reading suspension, the controller further comprising an interruption canceler for turning on the light source in addition to restarting the reading of the transferred document sheet when the cause for the reading suspension is removed.

According to a third aspect of the present invention, there is provided an image reading apparatus comprising: a transfer mechanism for transferring a document sheet along a transfer path; a light source for irradiating the transferred document sheet with light; an image sensor for reading images of the transferred document sheet by detecting the light reflected therefrom; and a controller for turning on the light source while the image sensor is reading the transferred document sheet but for turning off the light source upon completion of reading the transferred document sheet; wherein the controller comprises a reading interrupter for turning off the light source in addition to suspending the reading of the transferred document sheet when the image sensor reads a preset number of lines on the transferred document sheet, the controller further comprising an interruption canceler for turning on the light source in addition to restarting the reading of the successively transferred document sheet when a preset time lapses after the reading suspension.

Other objects, features and advantages of the present invention will be apparent from the detailed description of the embodiment given below with reference to the accompanying drawings.

DETAILED DESCRIPTION OF THE PREFERRED EMBODIMENTS

The preferred embodiments of the present invention will be described below with reference to the accompanying drawings.

Figure 1:
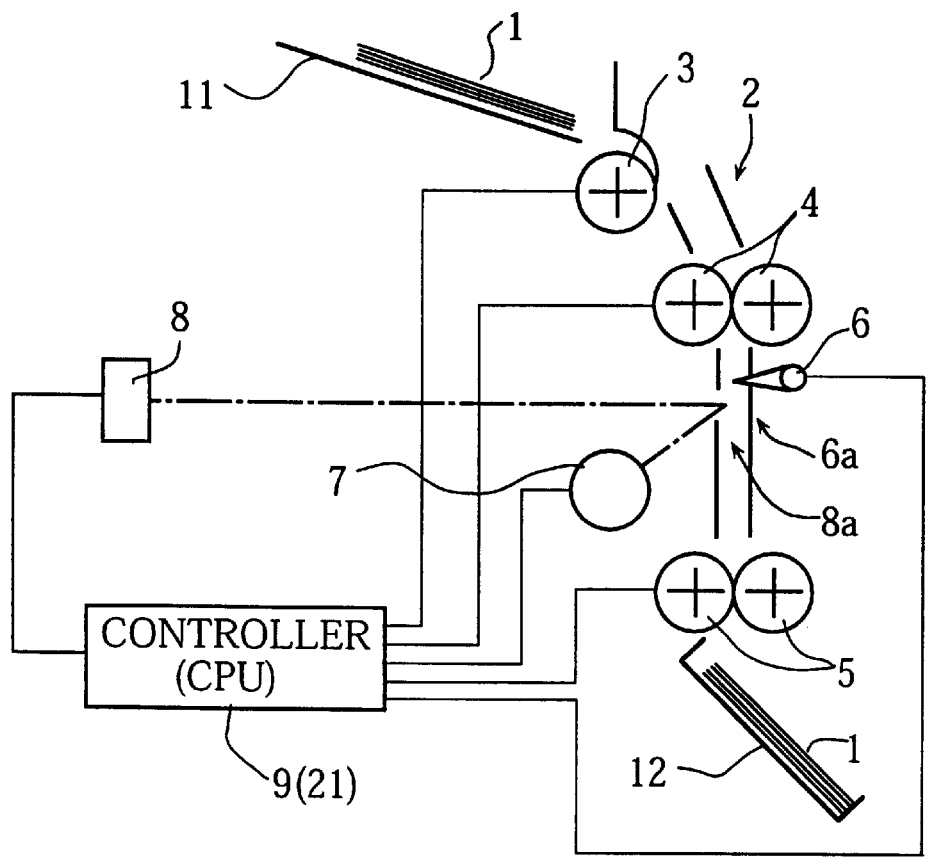
FIG. 1 is a schematic diagram showing an image reading apparatus embodying the present invention.

Referring first to FIG. 1, an image reading apparatus embodying the present invention includes a feed roller 3, a pair of transfer rollers 4, a pair of discharge rollers 5, a document detector 6, a light source 7, and an image sensor 8. The image reading apparatus also includes a document feed tray 11 and a document discharge tray 12. The feed roller 3, one of the transfer rollers 4 and one of the discharge rollers 5 are driven under the control of a controller 9 by a respective stepping motor (not shown) incorporated in the facsimile machine. Further, the controller 9 also controls the operation of the light source 7 and the image sensor 8 while also receiving detection signals from the document detector 6.

A plurality of document sheets 1 are supported in a stack on the document feed tray 11. Each of the document sheets 1 may carry full-color images or monochrome images.

The feed roller 3 is located immediately behind the document feed tray 11 and at the entrance of a document transfer path 2. The feed roller 3 is driven by the non-illustrated stepping motor for successively feeding each of the document sheets 1 from the document feed tray 11 onto the document transfer path 2. Thus, the combination of the document feed tray 11 and the feed roller 3 serves as an automatic document feeder (ADF).

The pair of transfer rollers 4 is arranged downstream from the feed roller 3 adjacent to the entrance of the document transfer path 2. The pair of transfer rollers 4 is driven by the non-illustrated stepping motor for transferring the document sheet 1 (which has been previously fed to the pair of transfer rollers 4) along the document transfer path 2 up to the pair of discharge rollers 5.

The pair of discharge rollers 5 is arranged downstream from the pair of transfer rollers 4. The pair of discharge rollers 5 is driven by the non-illustrated stepping motor for discharging the document sheet 1 into the document discharge tray 12.

The document detector 6 is arranged adjacent to the pair of transfer rollers 4 between the pair of transfer rollers 4 and the pair of discharge rollers 5. Normally, the document detector 6 partially projects into the document transfer path 2. However, if the leading edge of the document sheet 1 advanced by the pair of transfer rollers 4 comes into contact with the document detector 6 at a detecting position 6*a*, the document detector 6 pivots for causing an actuator device (not shown) to generate an ON-signal for input to the controller 9. On the other hand, if the trailing edge of the document sheet 1 moves past the detecting position 6*a*, the document detector 6 pivotally returns to it initial position, thereby causing the non-illustrated actuator device to generate an OFF-signal for input to the controller 9. Thus, the document detector 6 generates an ON-signal as long as a portion of a document sheet is present at the detecting position 6*a*, whereas the document detector 6 generates an OFF-signal in the absence of a document sheet at the detecting position 6*a*.

Figure 3:
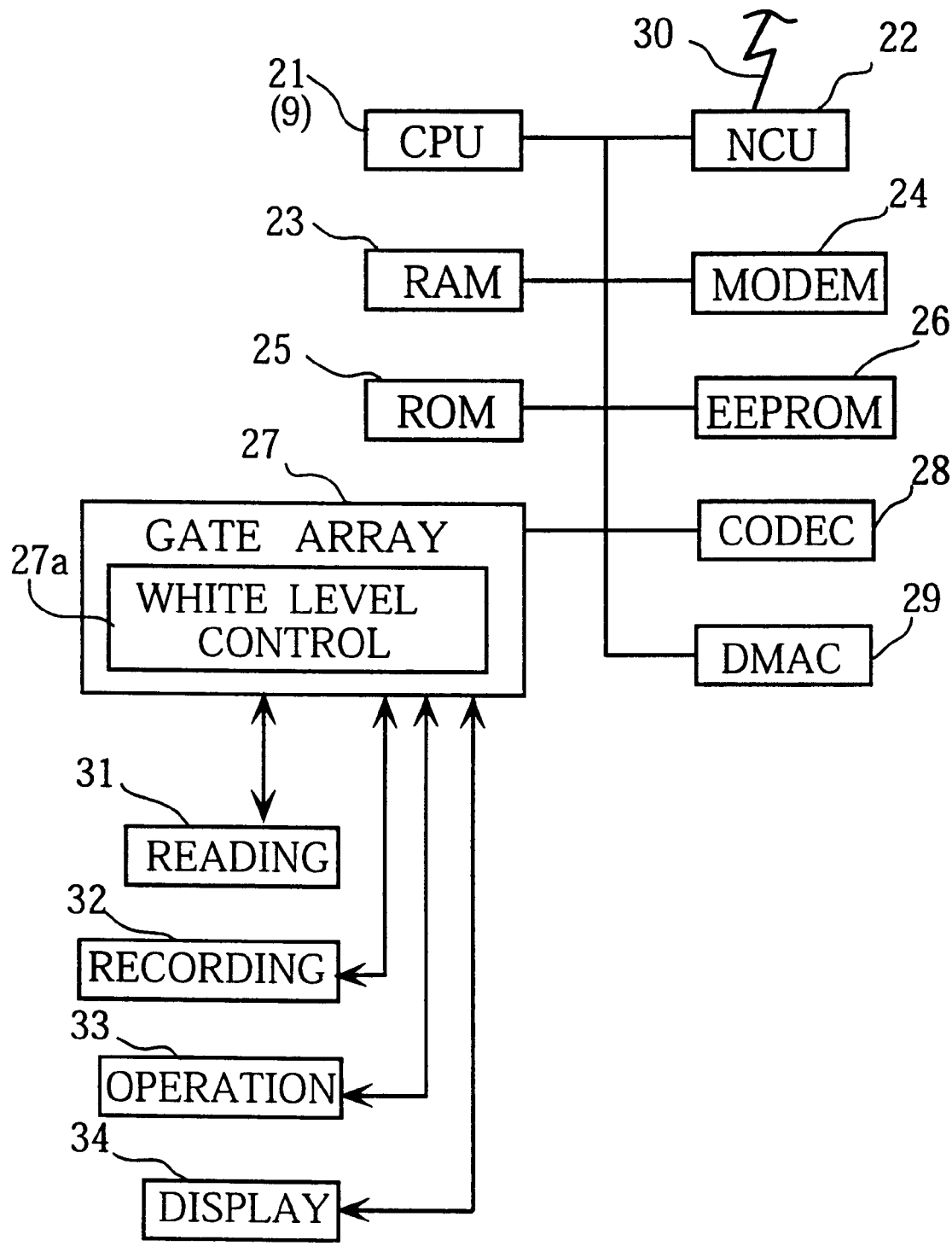
FIG. 3 is a circuit block diagram showing a facsimile machine which incorporates the same image reading apparatus as an image reading unit.

The light source 7 is provided to direct light toward an image reading position 8*a* which is positioned slightly downstream from the document detecting position 6*a*. In the illustrated embodiment, the light source 7 is an instant-on fluorescent lamp of the type which includes a glass tube containing a fluorescent substance therein and a parallel pair of longitudinal metal electrodes attached externally on the glass tube for discharging to cause fluorescent light generation, and which can be instantaneously turned on and off in response to a light-on signal and a light-off signal from the controller 9. Typically, the luminous energy characteristics of such a lamp is such that the luminous energy lowers sharply at an initial stage but gradually as the light-on time is extended, as shown in FIG. 3. Such luminous energy characteristics of the fluorescent lamp is considered attributable to the temperature rise of the lamp. Under the control of the controller, the lamp 7 is turned on for reading every document sheet but turned off after finishing reading of every document sheet for preventing the lamp from an excessive temperature rise (i.e., an excessive luminous energy drop), as more specifically described hereinafter.

The image sensor 8 is an image pickup apparatus which comprises a multiplicity of image pickup elements such as CCDs (charge-coupled devices). The image sensor 8 receives light reflected from the document sheet 1 at the image reading position 8a while scanning transversely of the document transfer direction in a plane parallel to the document sheet 1, thereby successively reading the images carried on the document sheet 1. The image sensor 8 converts the scanned image into electric image signals for output to the controller 9.

The image reading apparatus thus described may be incorporated in a facsimile machine as an image reading unit thereof, as shown in FIG. 3. The facsimile machine comprises a CPU (central processing unit) 21, an NCU (network control unit) 22, a RAM (random access memory) 23, a modem (modulator-demodulator) 24, a ROM (read-only memory) 25, an EEPROM (electrically erasable and programmable ROM) 26, a gate array 27, a codec (coder-decoder) 28, and a DMAC (direct memory access controller) 29. Further, the facsimile machine also comprises an image reading unit 31 (as the image reading apparatus shown in FIG. 1), a recording unit 32, an operation unit 33, and a display unit 34.

The CPU 21, the NCU 22, the RAM 23, the modem 24, the ROM 25, the EEPROM 26, the gate array 27, the codec 28 and the DMAC 29 are connected to each other via bus lines (digital lines). The bus lines include data bus lines, address bus lines and control signal bus lines. The gate array 27 is connected to the reading unit 31, the recording unit 32, the operation unit 33 and the display unit 34, respectively.

The CPU 21 provides an overall control of the facsimile machine as a whole. In the illustrated embodiment, the CPU 21 serves as the controller 9 for the image reading unit 31.

The NCU 22 is connected to a telephone line 30 for providing network control. The NCU 22 is also connected to the modem 24 through an analog line.

The RAM 23 stores various digital data such as image data. Of course, an additional RAM or RAMs may be provided to increase the capacity of data storage.

The modem 24 modulates the transmitting codes and demodulates the received codes.

The ROM 25 stores various programs or the like as required for controlling the facsimile machine, whereas the EEPROM 26 stores registered data (e.g. shortcut dials) and/or flags.

The gate array 27 functions as an I/O interface (input/output interface) for the CPU 21 for data transmission to and/or from the reading unit 31, the recording unit 32, the operation unit 33 and the display unit 34. In the illustrated embodiment, the gate array 27 incorporates a white level control circuit 27a, as described hereinafter.

The codec 28 performs coding of the transmitting image data and decoding of the received image data.

The DMAC 29 provides memory access control with respect to the RAM 23 and EEPROM 26 for example.

As previously described, the image reading unit 31 (image reading apparatus) reads out the image data from each of the successively transferred document sheets 1 (FIG. 1) for output to the CPU 21 (controller 9) through the gate array 27.

The recording unit 32 performs printing of images on a recording paper sheet (not shown) on the basis of the image data received from the CPU 21 through the gate array 27. For this purpose, the recording unit 22 includes a motor (not shown) and rollers (not shown) connected to the motor for transferring a recording paper sheet (not shown), in addition to a printhead (not shown) such as an ink jet printhead or a thermal printhead for printing out the received image data onto the recording paper sheet.

The operation unit 33 has key switches (not shown) to be operated by the user for output of operation signals, whereas the display unit 34 includes an LCD (not shown) or the like for providing various indications under the control of the CPU 21.

Briefly speaking, the CPU 21 operates for image reading in the following manner.

Before reading each of the successively transferred document sheets 1, the CPU 21 first determines, on the basis of the step count of the non-illustrated stepping motor for the feed roller 3 and the pair of transfer rollers 4 as well as the ON or OFF signal from the document detector 6, whether it is really necessary to start reading. If the CPU 21 determines it necessary to start reading, it generates a light-on signal for output to the fluorescent lamp 7. Light emitted from the lamp 7 is reflected on the presently transferred document sheet 1 for incidence to the image sensor 8 when in turn generates image data for temporary storage in the RAM 23.

If the CPU 21 determines that reading of the presently transferred document sheet 1 finishes, it generates a light-off signal for turning off the lamp 7 and maintains this light-off state until the next document sheet advances to a position for reading. Then, the CPU 21 generates a light-on signal for turning on the lamp 7 when the next document sheet comes to a position ready for reading.

Further, if the CPU 21 determines that reading needs to be temporarily suspended due to the memory full state of the RAM 23 for example, it also generates a light-off signal. Then, the CPU 21 generates a light-on signal for resumption of the image reading operation when the cause for the suspension is removed.

On the other hand, if the CPU 21 determines that the image sensor 8 starts reading the first one of the document sheets 1, it generates white level control data for memorization in the EEPROM 26 upon lapse of a preset wait time after the fluorescent lamp 7 is turned on.

In this way, the CPU 21 has the following functions. First, the CPU 21 serves as a reading start determiner for determining whether it is necessary to start reading each of the successively transferred document sheets 1. Secondly, the CPU 21 serves as a light-on instruction provider for turning on the fluorescent lamp 7 when starting to read each document sheet. In the third place, the CPU 21 functions as a timer for determining the lapse of a preset wait time when starting to read the first one of the successively transferred document sheets. In the fourth place, the CPU 21 works as an image obtainer for obtaining image date from the image sensor 8. In the fifth place, the CPU 21 functions as a light-off instruction provider for turning off the lamp 7 after completing to read each document sheet or when it is determined that reading of the document sheet needs to be suspended. In the sixth place, the CPU 21 serves as a white level control data generator for generating white level control data when starting to read the first one of the successively transferred document sheets. In the seventh place, the CPU 21 functions as a reading interrupter for suspending reading of each document sheet when such is called for. In the eighth place, the CPU 21 works as an in interruption canceler for canceling the reading suspension when such suspension becomes no longer necessary.

As previously described, the gate array 27 incorporates the white level control circuit 27a. This circuit functions to control or adjust the image data stored in the RAM 23 on the basis of the white level control data previously stored in the EEPROM 26.

Figure 2:
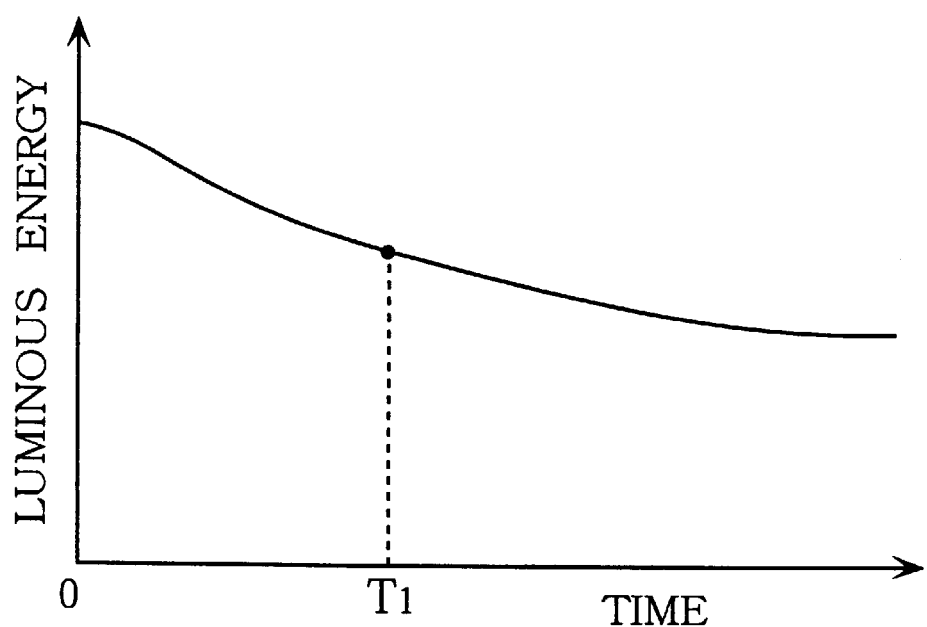
FIG. 2 is a graph showing the luminous energy characteristics of an instant-on fluorescent lamp incorporated in the same image reading apparatus.

Next, the image reading process provided by the image reading unit 31 (FIGS. 1 and 3) of the facsimile machine is more specifically described with reference to FIG. 4 (flow diagram) and FIGS. 1–3.

The image reading process starts when the user sets a plurality of document sheets 1 in a stack on the document feed tray 11 (FIG. 1) and pushes the start button (not shown) of the facsimile machine. As a result, the CPU 21 controls the feed roller 3 and the pair of transfer rollers 4 to rotate, thereby feeding the first one of the stacked document sheets 1 advances along the document transfer path 2. During such document transfer, the CPU 21 always monitors the step count of the stepping motor (not shown) for the feed roller 3 and the pair of transfer rollers 4.

In Step S1, the CPU 21 determines whether the document detector 6 detects the first one of the stacked document sheets 1 and transmits an ON signal for input to the CPU.

If "Yes" in Step S1, the CPU 21 controls the feed roller 3 and the pair of transfer rollers 4 for advancing the first document sheet to the image reading position 8a, whereby the CPU 21 transmits a light-on instruction signal for instantaneously turning on the fluorescent lamp 7 (Step S2). As a result, the first document sheet is irradiated with light at the image reading position 8a.

In Step S3, the CPU 21 performs its timer function for determining whether a preset wait time $T_1$ (see FIG. 2) has lapsed after turning on the lamp 7. As previously described with reference to FIG. 2, the luminous energy of the lamp 7 sharply drops immediately after turning on, but the luminous energy drop becomes gradual as the time lapses. Thus, by inserting the wait time $T_1$, it is possible to reduce the luminous energy variation in the course of reading the first document sheet in the subsequent period, thereby providing a better image reading quality.

If "Yes" in Step S3, the CPU 21 generates white level control data for output to the EEPROM 26 on the basis of the image signals from the image sensor 6 (Step S4).

In Step S5, the CPU 21 controls the image sensor 8 to read the images of the first document sheet 1 line by line while causing the pair of transfer rollers 4 to advance the first document sheet 1 along the transfer path 2.

In Step S6, the image data thus obtained by the image sensor 8 are transmitted to the white level control circuit 27a of the gate array 27 (see FIG. 3) which then performs white level adjustment of the image data on the basis of the white level control data stored in the EEPROM 26 before output to the CPU 21. The adjusted image data received by the CPU 21 are stored in the RAM 23.

In the course of such image reading, the CPU 21 checks whether the document detector 6 generates an OFF signal due to the passage of the trailing edge of the first document sheet beyond the detecting position 6a (Step S7).

If "Yes" in Step S7, the CPU 21 controls the pair of discharge rollers 5 to rotate for discharging the first document sheet into the discharge tray 12 while generating a light-off signal for instantaneously turning off the lamp 7 (Step S8).

Subsequently, the CPU 21 causes the feed roller 3 and the pair of transfer rollers 4 to feed the second one of the stacked document sheets 1 by a predetermined amount while checking whether an ON signal is entered from the document detector 6 (Step S9).

If "Yes" in Step S9, the CPU 21 immediately generates a light-on signal for instantaneously turning on the lamp 7 which has been previously turned off (Step S10). At this time, the lamp 7 has been cooled down to some extent (but not completely) due to the previous turning-off. As a result, the luminous energy of the lamp 7 can be recovered nearly to the point where the white level control was performed for the first document sheet, thereby making it possible to perform reading of the second document sheet with substantially the same color or gray level quality.

Apparently, the second document sheet can be read by repeating Steps S5–S9. Further, the third and any subsequent ones of the document sheets may be read by repeating Steps S5–S10 in a loop manner.

If "No" in Step S9, the CPU 21 determines that there is no more document sheet left on the document feed tray 11, thereby terminating the image reading routine.

If "No" in Step S7, the CPU 21 determines that the presently transferred document sheet has further lines to be read, so that Steps S5 and S6 are repeated until the document sheet is entirely read (i.e., until the document detector 6 transmits an OFF signal).

If "No" in Step S3, the CPU 21 as the timer waits until the preset wait time $T_1$ lapses.

If "No" in Step S1, the CPU 21 determines that there is no more document sheet left on the document feed tray 11, thereby terminating the image reading routine.

According to the image reading process described above, since the fluorescent lamp 7 is turned on at the time of starting to read every document sheet but turned off upon completion of reading every document sheet, the lamp luminous energy is prevented from excessively dropping due to an excessive temperature rise of the lamp. As a result, every one of the successively transferred document sheets can be read under similar luminous energy condition with substantially the same color or gray level quality.

Further, since the lamp 7 is turned off upon completion of reading every document sheet, it is possible to reduce power consumption.

Figure 4:
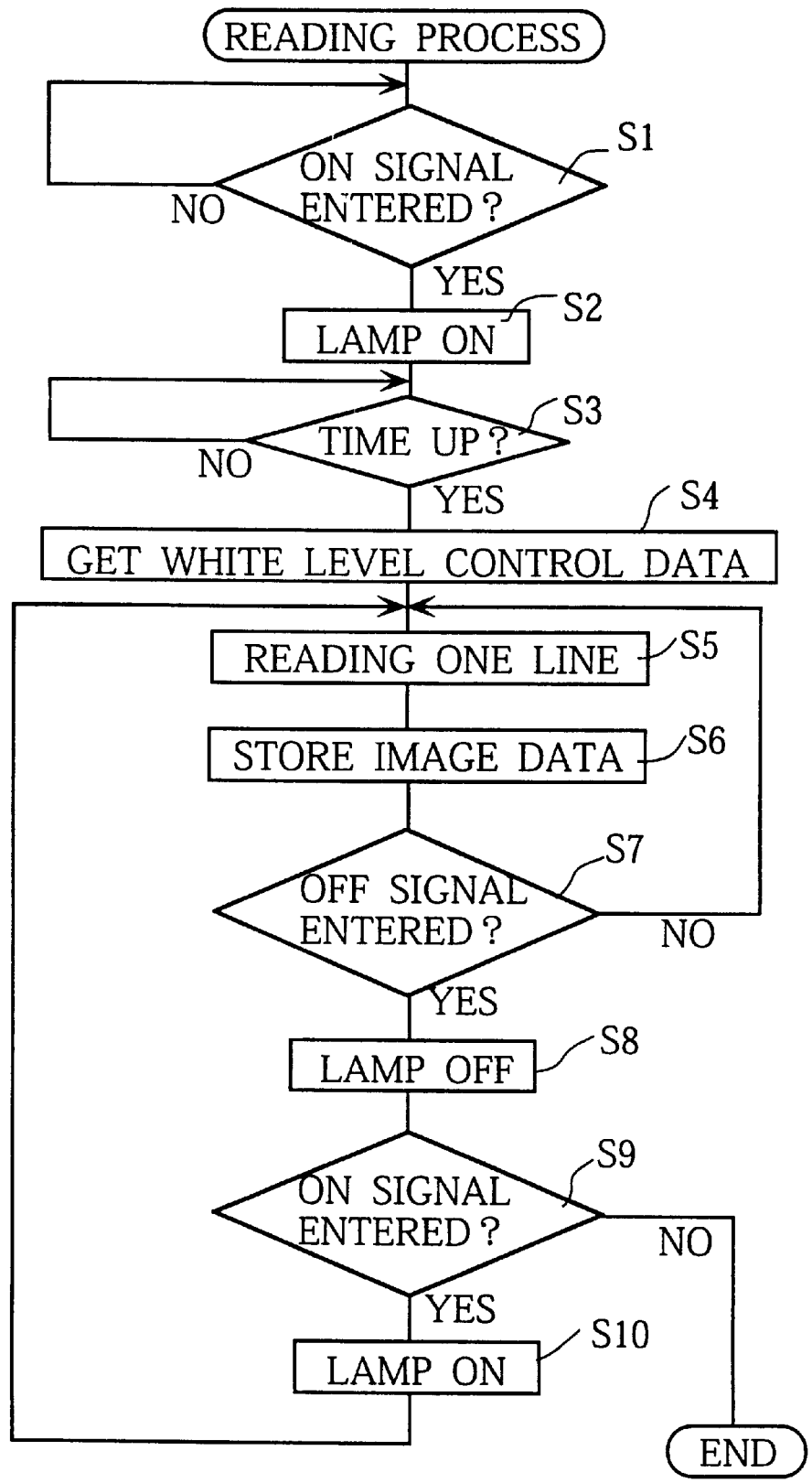
FIG. 4 is a flow diagram showing an image reading process performed by the image reading unit of the same facsimile machine.
Figure 5:
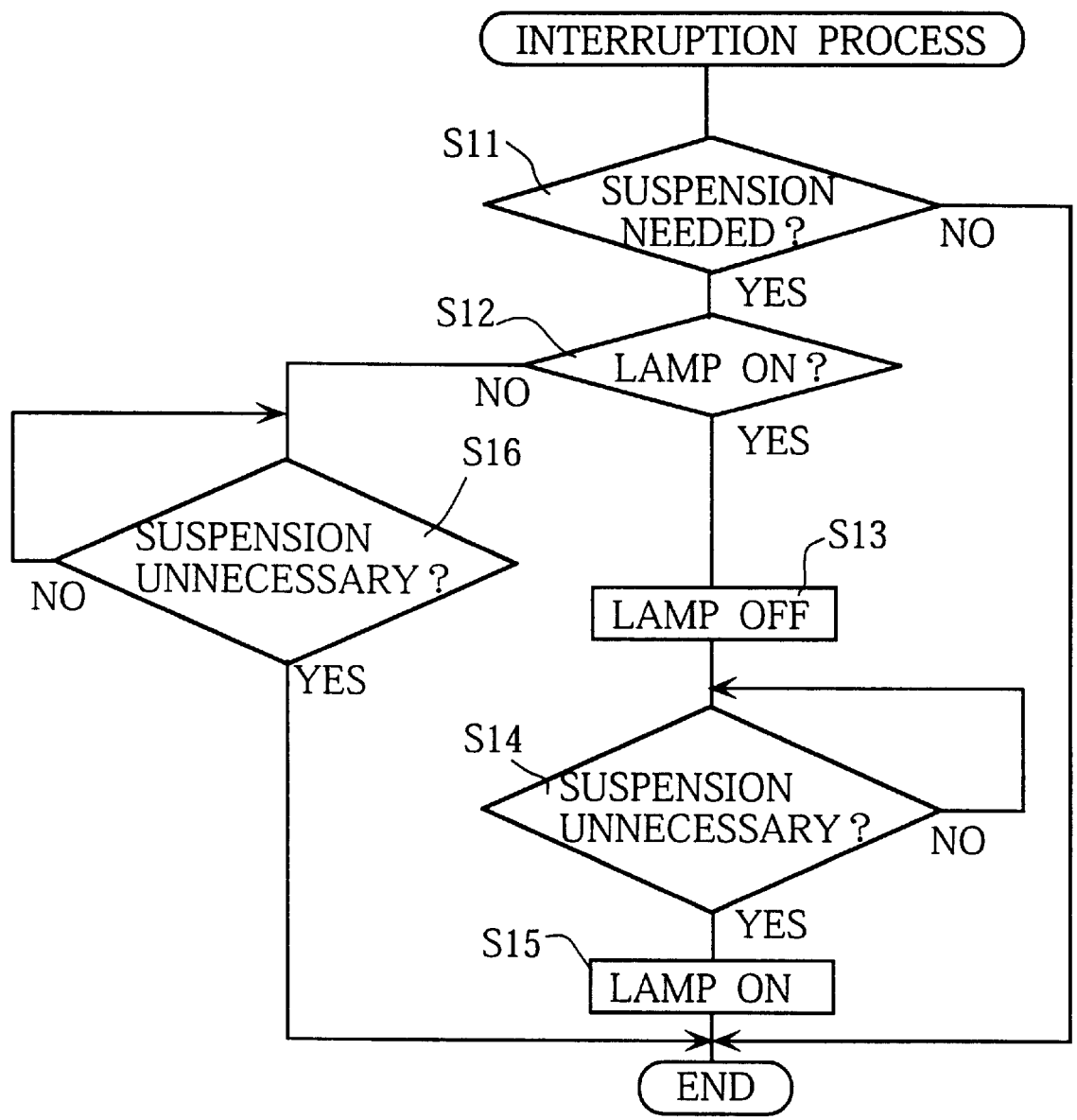
FIG. 5 is a flow diagram showing an interruption process performed by the image reading unit of the same facsimile machine.

FIG. 5 shows an interruption process which may be preferably added to the image reading process illustrated in FIG. 4. The interruption process of FIG. 5 is particularly advantageous in case where the capacity of the RAM 23 or any other memory device used instead is insufficient for image data storage. Such a case often arises when the image reading speed of the image reading unit or apparatus 31 is higher than the speed of transmitting the image data to a counterpart machine (e.g. other facsimile machine or personal computer).

The interruption process of FIG. 5, which is performed cyclically at a constant interval while the image reading process (particularly Steps S5 and S6) of FIG. 4 is performed, includes Step S11 wherein the CPU 21 determines whether the image reading process needs to be suspended. As described above, such a need arises, for example, when the RAM 23 becomes full or nearly full in the course of the image reading process.

If "Yes" in Step S11, the CPU 21 suspends the transfer of the document sheet and checks whether the fluorescent lamp 7 is held in its ON state (Step S12).

If "Yes" in Step S12, the CPU 21 transmits a light-off instruction for turning off the lamp 7 (Step S13).

Then, the CPU 21 checks whether the cause for the reading suspension has been removed (Step S14). If "No" in this step, the CPU 21 waits until the cause for the reading suspension is removed.

If "Yes" in Step S14, the CPU 21 transmits a light-on instruction for turning on the lamp 7 and restarts the document transfer (Step S15). As a result, the interruption process terminates, and the image reading process (FIG. 4) resumes from the point where the reading process was previously suspended.

On the other hand, if "No" in Step S12, it means that the lamp 7 is already held off and therefore requires no turning-off. Such a situation occurs, for example, when the RAM 23 becomes full immediately after completely reading a certain document sheet but before starting to read the next document sheet.

Therefore, in Step S16 following Step S15, the CPU 21 checks whether the cause for the reading suspension has been removed. If "No" in this step, the CPU 21 waits until the cause for the reading suspension is removed.

If "Yes" in Step S16, the interruption process terminates, and the image reading process (FIG. 4) resumes which includes turning on the lamp 7 when the document sheet advances to the detecting position 6a (Step S1 in FIG. 4).

According to the interruption process described above, the fluorescent lamp 7 is turned off whenever the image reading process is suspended. Thus, it is possible to prevent the lamp 7 from being heated excessively in the suspension period, so that the luminous energy of the lamp will not drop to the extent of unduly deteriorating the reading quality. Further, it is also possible to avoid wastefully consuming the electric power in the suspension period.

With regard to the interruption process, it should be understood that the RAM 23 may become full even at the time of reading only a single document sheet. Therefore, the interruption process of FIG. 5 is effective not only for successively reading a plurality of document sheets but also for reading a single document sheet.

Figure 6:
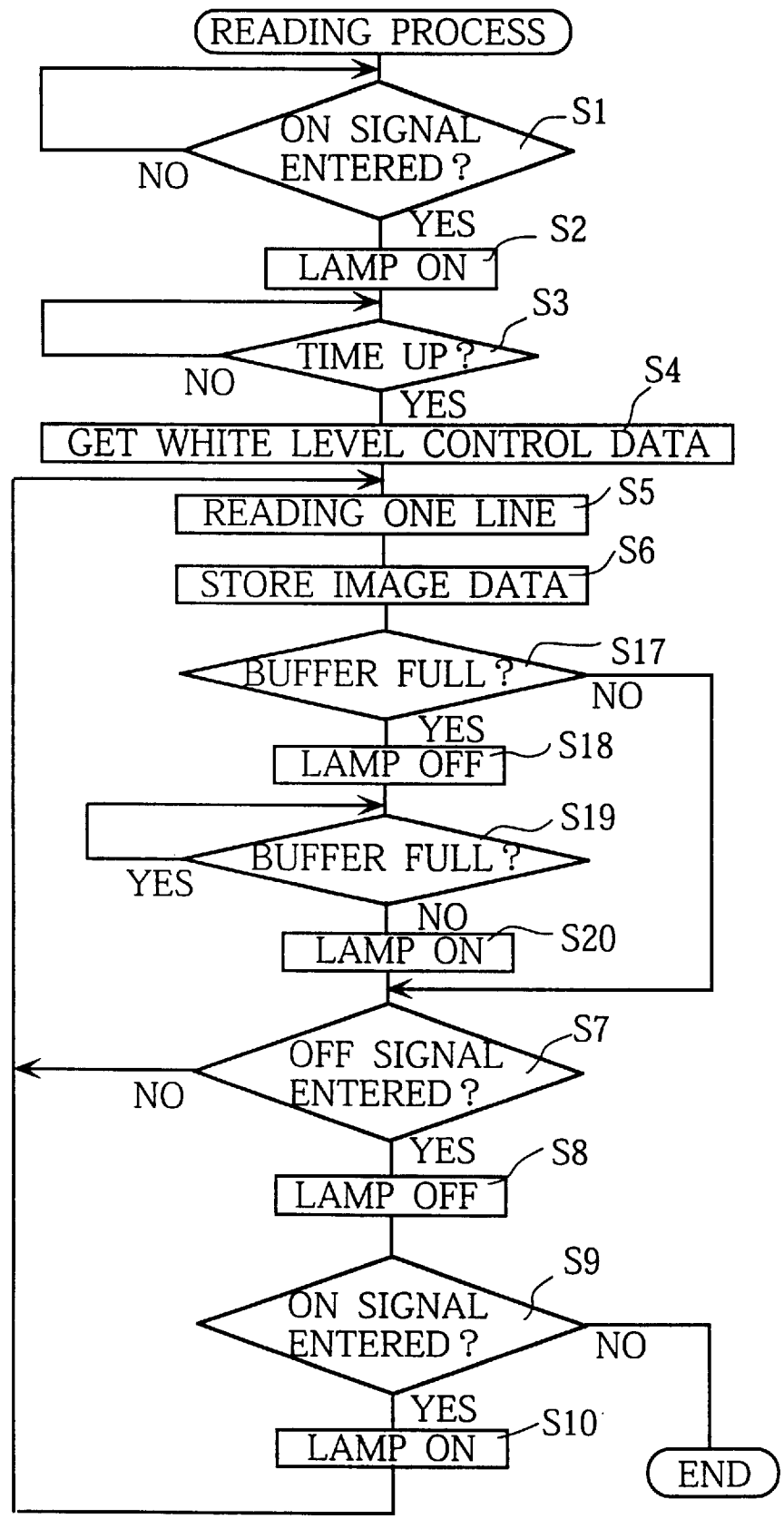
FIG. 6 is a flow diagram showing another image reading process performed by the image reading unit of the same facsimile machine.
Figure 7:
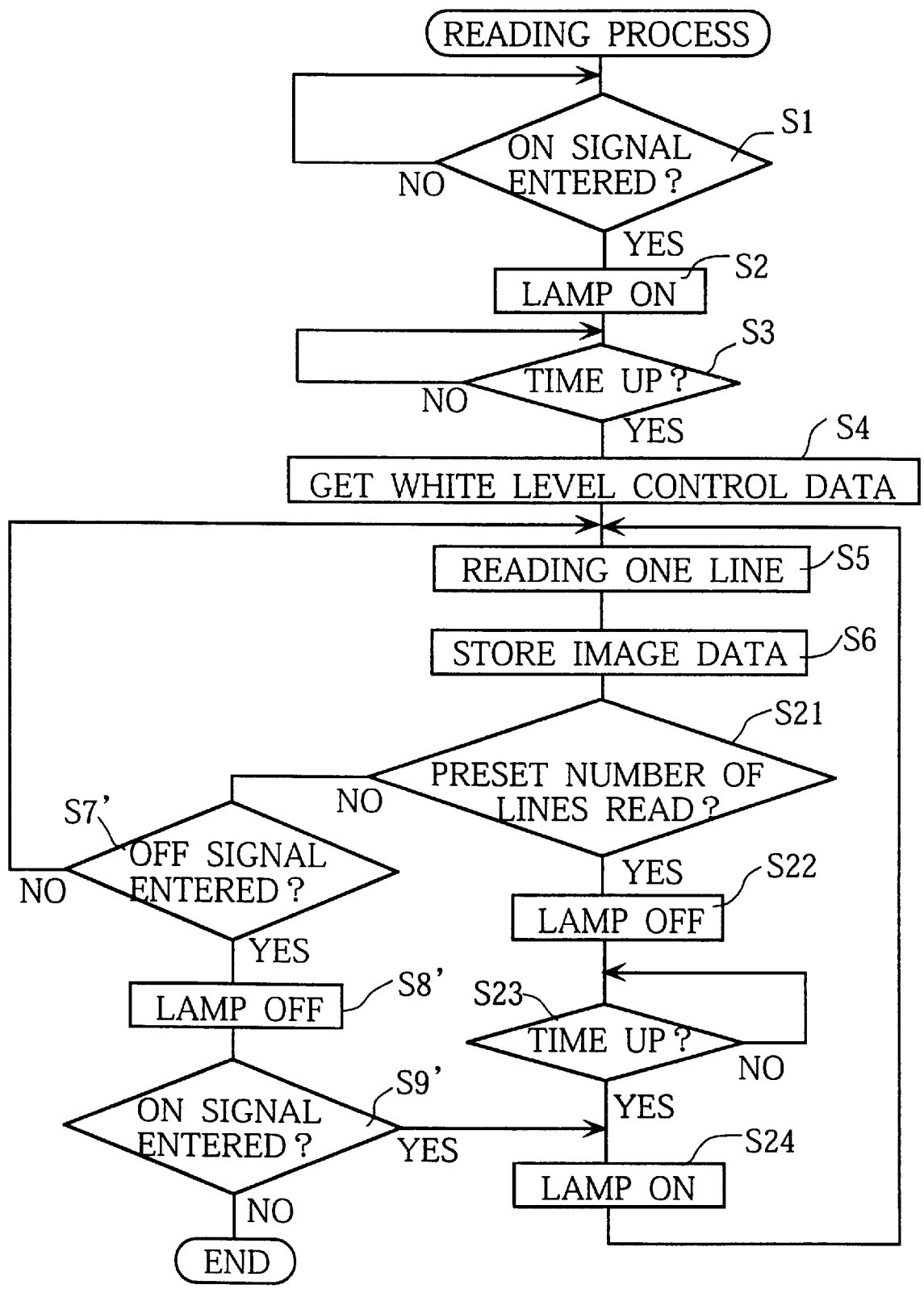
FIG. 7 is a flow diagram showing a further image reading process performed by the image reading unit of the same facsimile machine.

FIG. 6 is a flow diagram illustrating a modified image reading process embodying the present invention. The modified process of FIG. 7 is similar to the image reading process of FIG. 4 but differs therefrom in that the memory-full checking of the RAM 23 or any other buffer memory is performed not as an interruption process but as a part of the main image reading process routine. Steps S1–S6 of the modified process are identical to those of the image reading process illustrated in FIG. 4, so that the description of these process steps are omitted.

In Step S17 following Step S6, the CPU 21 determines whether the RAM 23 as a buffer memory is full.

If "Yes" in Step S17, the CPU 21 causes the fluorescent lamp 7 to turn off (Step S18).

Then, the CPU 21 again determines whether the buffer memory is full (Step S19).

If "Yes" in Step S19, the CPU 21 causes the fluorescent lamp 7 to turn on (Step S20).

If "No" in Step S19, the CPU 21 waits until the buffer memory becomes ready for storing new image data while holding the lamp 7 in its off-state.

Step S20 is followed by Steps S7–S10 which are already described for the image reading process shown in FIG. 4.

Apparently, the insertion of Steps S17–S20 in the image reading process provides the same technical advantages as the interruption process of FIG. 5 which is added to the image reading process of FIG. 4.

FIG. 7 is a flow diagram illustrating another modified image reading process embodying the present invention. The modified process of FIG. 7 is similar to the combination of the FIG. 4 process and the FIG. 5 process but differs therefrom in that the image reading process may be suspended even if the RAM 23 has a sufficient capacity. Steps S1–S6 of the modified process are identical to those of the image reading process illustrated in FIG. 4, so that the description of these process steps are omitted.

In Step S21 following Step S6, the CPU 21 determines whether the image sensor 8 (FIG. 1) has read a preset number of lines for any document sheet.

If "No" in Step S21, the CPU 21 checks whether the document detector 6 generates an OFF signal due to the passage of the trailing edge of the presently transferred document sheet beyond the detecting position 6a (Step S7').

If "No" in Step S7', the CPU 21 determines that the presently transferred document sheet has further lines to be read, so that Steps S5 and S6 are repeated. In the course of such image reading, it is possible that the line count obtained in Step S21 reaches the preset number if the document sheet is relatively large in size.

Thus, if "Yes" in Step 21, the CPU 21 stops the document transfer and generates a light-off instruction for turning off the lamp 7 (Step S22), thereby suspending the reading of the document sheet.

Then, the CPU 21 performs its timer function for determining whether a preset cool-down time has lapsed after turning off the lamp 7 (Step S23).

If "Yes" in Step S23, the CPU 21 provides a light-on instruction for turning on the lamp and restarts the document transfer (Step S24) for continuing the document reading (Steps S5 and S6).

If "No" in Step S23, the CPU 21 waits until the preset cool-down time lapses.

On the other hand, if "Yes" in Step S7', this means that the size of the document sheet is relatively small, so that the reading of the entire document sheet before the image sensor 8 reads the preset number of lines. In this case, the CPU 21 controls the pair of discharge rollers 5 to rotate for discharging the document sheet into the discharge tray 12 while generating a light-off signal for instantaneously turning off the lamp 7 (Step S8').

Subsequently, the CPU 21 causes the feed roller 3 and the pair of transfer rollers 4 to feed the next document sheet by a predetermined amount while checking whether an ON signal is entered from the document detector 6 (Step S9').

If "Yes" in Step S9', the reading process proceeds to Step 24 for starting to read the next document sheet.

If "No" in Step S9', the CPU 21 determines that there is no more document sheet left on the document feed tray 11, thereby terminating the image reading routine.

According to the modified image reading process illustrated in FIG. 7, since the reading process is suspended halfway in the light-off state if the document sheet is relatively large in size, the fluorescent lamp 7 is prevented from being excessively heated due to a relatively long reading time. As a result, the luminous energy of the lamp will not drop to the extent of unduly deteriorating the reading quality. Further, it is also possible to avoid wastefully consuming the electric power in the suspension period.

It should be noted that the modified image reading process is effective not only for successively reading a plurality of document sheets but also for reading a single document sheet which is relatively large in size. Further, the modified image reading process may be applied regardless of the size of the document sheet to be read.

The present invention being thus described, it is obvious that the same may be varied in many ways. For instance, the present invention is not limited in applicability to an image reading unit of a facsimile machine, but may be equally applicable to an image scanner, photocopier or multifunction center. Further, the image sensor 8 may be in the form of a contact type image sensor which comprises a multiplicity of photoelectric elements. Such variations should not be regarded as a departure from the spirit and scope of the present invention, and all such modifications as would be obvious to those skilled in the art are intended to be included within the scope of the following claims.

I claim:

1. An image reading apparatus comprising:

a transfer mechanism for successively transferring a plurality of document sheets along a transfer path;

a light source for irradiating each of the successively transferred document sheets with light;

an image sensor for reading images of said each of the successively transferred document sheets by detecting the light reflected therefrom; and a controller for turning on the light source while the image sensor is reading said each of the successively transferred document sheets but for turning off the light source upon completion of reading said each of the successively transferred document sheets.

2. The image reading apparatus according to claim 1, wherein the light source is an instant-on fluorescent lamp having luminous energy which decreases with light-on time.

3. The image reading apparatus according to claim 1, wherein the controller controls the light source to turn on a predetermined time prior to reading said each of the successively transferred document sheets.

4. The image reading apparatus according to claim 2, further comprising a white level control circuit, the controller comprising a white level control data generator for generating white level control data on the basis of the light reflected from a first one of the successively transferred document sheets upon lapse of a preset wait time after the lamp is turned on, the white level control circuit adjusting the images of said each of the successively transferred document sheets on the basis of the white level control data generated by the controller.

5. The image reading apparatus according to claim 1, further comprising a memory for storing the images read by the image sensor, the controller comprising a reading interrupter for turning off the light source in addition to suspending the reading of said each of the successively transferred document sheets when the memory becomes full, the controller further comprising an interruption canceler for turning on the light source in addition to restarting the reading of said each of the successively transferred document sheets when the memory becomes ready for image storage.

6. The image reading apparatus according to claim 1, wherein the controller comprises a reading interrupter for turning off the light source in addition to suspending the reading of said each of the successively transferred document sheets when the image sensor reads a preset number of lines on said each of the successively transferred document sheets, the controller further comprising an interruption canceler for turning on the light source in addition to restarting the reading of said each of the successively transferred document sheets when a preset time lapses after the reading suspension.

7. The image reading apparatus according to claim 1, wherein the image sensor is a full-color image sensor.

8. The image reading apparatus according to claim 1, wherein the controller is a central processing unit of a machine which incorporates the image reading apparatus.

9. The image reading apparatus according to claim 8, wherein the machine is a facsimile machine.

10. An image reading apparatus comprising:

a transfer mechanism for transferring a document sheet along a transfer path;

a light source for irradiating the transferred document sheet with light;

an image sensor for reading images of the transferred document sheet by detecting the light reflected therefrom; and a controller for turning on the light source while the image sensor is reading the transferred document sheet but for turning off the light source upon completion of reading the transferred document sheet;

wherein the controller comprises a reading interrupter for turning off the light source in addition to suspending the reading of the transferred document sheet when the controller detects a predetermined cause for the reading suspension, the controller further comprising an interruption canceler for turning on the light source in addition to restarting the reading of the transferred document sheet when the cause for the reading suspension is removed.

11. The image reading apparatus according to claim 10, further comprising a memory for storing the images read by the image sensor, the cause for the reading suspension being a full state of the memory.

12. The image reading apparatus according to claim 10, wherein the light source is an instant-on fluorescent lamp having luminous energy which decreases with light-on time.

13. An image reading apparatus comprising:

a transfer mechanism for transferring a document sheet along a transfer path;

a light source for irradiating the transferred document sheet with light;

an image sensor for reading images of the transferred document sheet by detecting the light reflected therefrom; and a controller for turning on the light source while the image sensor is reading the transferred document sheet but for turning off the light source upon completion of reading the transferred document sheet;

wherein the controller comprises a reading interrupter for turning off the light source in addition to suspending the reading of the transferred document sheet when the image sensor reads a preset number of lines on the transferred document sheet, the controller further comprising an interruption canceler for turning on the light source in addition to restarting the reading of the transferred document sheet when a preset time lapses after the reading suspension.

14. The image reading apparatus according to claim 13, wherein the light source is an instant-on fluorescent lamp having luminous energy which decreases with light-on time.

* * * * *